United States Patent [19]

Fujimoto et al.

[11] Patent Number: 4,856,479
[45] Date of Patent: Aug. 15, 1989

[54] IGNITION TIMING CONTROL APPARATUS FOR AN INTERNAL COMBUSTION ENGINE

[75] Inventors: Takanori Fujimoto; Toshiro Hara; Satoshi Komurasaki, all of Himeji, Japan

[73] Assignee: Mitsubishi Denki Kabushiki Kaisha, Tokyo, Japan

[21] Appl. No.: 196,616

[22] Filed: May 20, 1988

[30] Foreign Application Priority Data

May 22, 1987 [JP] Japan .................................. 62-126507
May 26, 1987 [JP] Japan .................................. 62-130215

[51] Int. Cl.$^4$ ............................................... F02P 5/15
[52] U.S. Cl. .................................................... 123/425
[58] Field of Search ..................... 123/425, 435; 73/35

[56] References Cited

U.S. PATENT DOCUMENTS

| | | | |
|---|---|---|---|
| 4,279,143 | 7/1981 | Guipaud | 123/425 X |
| 4,343,278 | 8/1982 | Asano | 123/425 |
| 4,377,999 | 3/1983 | Komurasaki et al. | 123/425 |
| 4,425,891 | 1/1984 | Kashimura et al. | 123/425 |

Primary Examiner—Tony M. Argenbright
Attorney, Agent, or Firm—Oblon, Spivak, McClelland, Maier & Neustadt

[57] ABSTRACT

An output of a knocking discriminator is integrated by an integrator and the integrated value is reset by a resetting device in response to the operation in the ignition timing. The resetting operation of the resetting device is caused when both a cylinder pulse signal and an output signal from a micro-computer are inputted, and the resetting operation is cancelled when at least one of the signals disappears.

8 Claims, 8 Drawing Sheets (A)

(B)

(C)

ized by the predetermined ignition timing characteristic of the rotation signal generator 9.

IGNITION TIMING CONTROL APPARATUS FOR AN INTERNAL COMBUSTION ENGINE

BACKGROUND OF THE INVENTION

1. FIELD OF THE INVENTION

The present invention relates to an ignition timing control apparatus for an internal combustion engine for controlling a knocking in the engine.

2. DISCUSSION OF BACKGOUND

FIG. 10 is a block diagram showing a conventional ignition timing control apparatus for an internal combustion engine.

In FIG. 10, a reference numeral 1 designates an acceleration sensor attached to the internal combustion engine to detect a vibration acceleration in the engine, a numeral 2 designates a frequency filter which passes only a frequency signal component having a high sensitivity to a knocking among output singals from the acceleration sensor 1, a numeral 3 designates an analog gate for blocking noises which disturb the detection of the knocking signal in output signals from the frequency filter 2, a numeral 4 designates a gate timing controller 4 for generating an instruction signal to open or close the analog gate 3 in response to the generation of noises, a numeral 5 designates a noise level detector for detecting the level of mechanical vibration noises of the engine except for the knocking signals, a numeral 6 designates a comparator for comparing the output voltage of the analog gate 3 with the output voltage of the noise level detector 5 to produce a knocking detection pulse signal, a numeral 7 designates an integrator which integrates the pulse signal from the comparator 6 to thereby produce an integrated voltage in response to the magnitude of the knocking, a numeral 8 designates a phase shifter for displacing the phase of a reference ignition signal in response to the output voltage of the integrator 7, a numeral 9 designates a rotation signal generator for generating an ignition signal in accordance with a predetermined ignition advance angle characteristic, a numeral 10 designates a waveform shaping circuit which is adapted to shape the ignition signal of the rotation signal generator 9 and at the same time, to control the closing angle in current conduction in an ignition coil 12, and a numeral 11 designates a switching circuit for interrupting or continuing the current conduction to the ignition coil 12 in response to the output signal of the phase shifter 8.

FIG. 11 shows frequency characteristic in the output signal from the acceleration sensor 1. In FIG. 11, a curve A designates the characteristic in a case where a knocking does not take place, and a curve B designates the characteristic in a case where the knocking takes place.

In the output signal of the acceleration sensor 1, there are included a knocking signal, and the other signals generated when the knocking takes place, such as mechanical noises of the engine other than the knocking signal, and various noise components carried on a signal transmission line such as ignition noises, and so on.

In comparing the curve A with the curve B in FIG. 11, it is understood that the knocking signal has a peculiar frequency characteristic. Although the distribution in frequency varies depending on engines to be used and the position of the acceleration sensor 1 attached to the engine, there is clear difference between the case that the knocking occurs and the case that knocking does not occur. Accordingly, by filtering a frequency component of the knocking signal, the noises having the other frequency components are suppressed and the knocking signal can be effectively detected.

FIGS. 12 and 13 show operating waveforms for various elements shown in FIG. 12. FIG. 12 shows mode where there takes place no knocking in the engine, and FIG. 13 shows mode where there take place knockings in the engine.

The operations of the ignition timing control apparatus will be described with reference to FIGS. 12 and 13.

When the internal combustion engine is actuated, the rotation signal generator 9 generates an ignition signal in response to an ignition timing characteristic which is previously determined. The ignition signal is then subjected to waveform-shaping to be transformed into an opening and closing pulse signal with a given closing angle by the waveform shaping circuit 10. The shaped ignition signal drives the switching circuit 11 through the phase shifter 8 to thereby turn on and off current-feeding to the ignition coil 12. When the current is interrupted, the engine is fired by an ignition voltage produced in the ignition coil 12. Vibrations in the engine caused in the operation of the engine are detected by the acceleration sensor 1.

When there is no knocking in the engine, the vibrations in the engine resulted from the knocking do not occur. However, the mechanical noises and the ignition noises are carried on the signal transmission line even in the ignition F, and they are contained in the output signal of the acceleration sensor 1 as shown in FIG. 12a. When the output signal is passed through the frequency filter 2, the machanical noise components are fairly suppressed as shown in FIG. 12b. However, the output signal having a large ignition noise component is sometimes outputted even after being passed through the frequency filter 2 since the magnitude of the ignition noise component is large. In this case, the ignition noises are recognized as knocking signals. Therefore, the analog gate 3 is used to block the ignition noises by closing its gate during a certain period when the ignition takes place, this being effected by the output of the gate timing controller 4 which is triggered by the output of the phase shifter 8 (FIG. 12c). As a result, only mechanical noises having a low level as indicated by A in FIG. 12d remains in the output of the analog gate 3.

On the other hand, the noise level detector 5 responds to change of the peak value of the output signal of the analog gate 3. In this case, the noise level detector 5 has the characteristics capable of responding to a relatively slow change in the peak value of mechanical noises and generates a d.c. voltage slightly higher than the peak value of the mechanical noises (as indicated by B in FIG. 12d).

Accordingly, since the output of the noise level detector 5 is greater than the average peak value of the output signal from the analog gate 3 as shown in FIG. 12d, no output signal is produced from the comparator 6 for comparing both signals as shown in FIG. 12e, with the result that the noise signal is completely removed. Accordingly, since there is no output voltage from the integrator 7 as shown in FIG. 12f, a phase angle (difference of phase between the input and output signals of the phase shifter in FIGS. 12g and 12h) given by the phase shifter 8 is also zero. Accordingly, the phase of opening and closing the switching circuit driven by the output signal of the phase shifter 8, i.e. the phase of the current intermittently produced in the ignition coil 12 is the same as the phase of the reference ignition signal as the output from the waveform shaping circuit 10, whereby the ignition timing corresponds to the reference ignition timing.

When a knocking takes place, the output of the acceleration sensor 1 contains the knocking signal with a certain time delay from the ignition timing as shown in FIG. 13a, and the signal after being passed through the frequency filter 2 and the analog gate 3 is such that the knocking signal is overlapped with the mechanical noises as indicated by A in FIG. 13d. Of the signal passed through the analog gate 3, since the rising part of the knocking signal is steep, response of the output voltage of the noise level detector 5 to the knocking signal is delayed. As a result, the input signals to the comparator 6 respectively take the form as shown by A and B in FIG. 13d, whereby a pulse signal is produced in the output of the comparator 6 as shown in FIG. 13e.

The integerator 7 integrates the pulses to thereby produce an integrated voltage as shown in FIG. 13f. Since the phase shifter 8 displaces the output signal (the reference ignition signal as by FIG. 13g) of the waveform shaping circuit 10 to the side of delay in time in response to the output voltage of the integrator 7, the phase of the output signal of the phase shifter 8 is lagged with respect to the phase of the reference ignition signal of the waveform shaping circuit 10. With such lag in phase of the output of the phase shifter 8, the switching circuit 11 is actuated with the phase as shown in FIG. 13h. Accordingly, there causes delay in ignition timing, whereby the knocking is suppressed. Thus, the optimum ignition timing controlling is obtained in a manner as described with reference to FIGS. 12 and 13.

In the conventional apparatus having the above-mentioned construction, a reducing rate (a speed for shifting ignition timing toward the advance angle side with respect to the reference) in the output of the integrator 7 has a large time constant of a second or seconds per one revolution angle of the engine. The reducing rate suppress occurrence of a large knocking which may take place when a speed for shifting the igntion timing toward the advance angle side is too fast whereby the ignition timing falls rapidly in a knocking region. Thus, the reducing rate is an important factor to control the ignition timing. Accordingly, in order to obtain an amount of knocking at each time of the detection of the knocking from the outputs of the integrator 7, it is necessary to obtain the output of the integrator 7 at the time just before and just after the detection of the knocking and the difference between the values detected before and after the detection of the knocking, i.e. an amount of change of output from the integrator 7 at each time of the detection of the knocking. This requires complicated operations. The difference in outputs or the change of an output can not be obtained by taking only the value of the integrator 7 at the time of the detection of knocking. Accordingly, it is required, for instance, such a operation that the output of the integrator 7 before the generation of a knocking is memorized, and when the knocking takes place, the ouptut of the intergrator 7 just before the generation of knocking is compared with the output just after the generation of knocking to thereby obtain the value of difference.

On the other hand, there is an increasing tendency of finely controlling the engine of an automobile, namely, a fine control is made for each cylinder to realize a good condition of combustion for all of the cylinders whereby the performance of the engine is increased. As one way to perform the fine control of the engine, it is necessary to detect the magnitude of the knocking at each time of the generation of it and to obtain the magnitude of the knocking for each of the cylinders. However, complicated operations were required to obtain the magnitude of the knocking at each time of the generation of the knocking from the output of the integrator 7 in the conventional apparatus. Further a large sized circuit was required for the above-mentioned purpose.

SUMMARY OF THE INVENTION

It is an object of the present invention to provide an ignition timing control apparatus for an internal combustion engine capable of detecting the quantity of each knocking; of obtaining the magnitude of the knocking for each cylinder, and of controlling the knocking with high accuracy.

One aspect of the present invention is to provide an ignition timing control apparatus for an internal combustion engine comprising a knocking sensor for detecting a knocking produced in the engine, a knocking discriminator for discriminating the knocking produced in each cylinder of the engine on the basis of an output from the knocking sensor, an integrating device for integrating an output from the knocking discriminator, a cylinder pulse generating device for generating a cylinder pulse signal at a predetermined crank angle which corresponds to an ignition timing, and a micro-computer for operating ignition timing on the basis of the cylinder pulse signal from the cylinder pulse generating device and the vlaue integrated in the integrating device, the ignition timing control device being characterized by comprising a resetting means to reset the integrated value in response to the operation of ignition timing, wherein the resetting operation by said resetting device is caused when both the cylinder pulse signal and the output signal of the micro-computer are inputted, and the resetting operation is cancelled when at least one of the signals disappears.

Another aspect of the present invention is to provide an ignition timing control apparatus for an internal combustion engine which comprises a knocking sensor for detecting a knocking produced in the engine, a knocking discriminator for discriminating the knocking produced in each cylinder of the engine on the basis of an output from the knocking sensor, an integrating device for integrating an output from the knocking discriminator, a cylinder pulse generating device for generating a cylinder pulse signal at a predetermined crank angle in an area other than the area where a knocking occurs and for resetting the integrating device upon receipt of the cylinder pulse signal, an accumulating device for accumulating an output from the integrating device, a phase shifter for controlling, in response to an output from the accumulating device, the phase of an ignition signal corresonding to the cylinder pulse signal, and a switching circuit for feeding and stopping an electric current to an ignition coil in response to an ouput from the phase shifter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
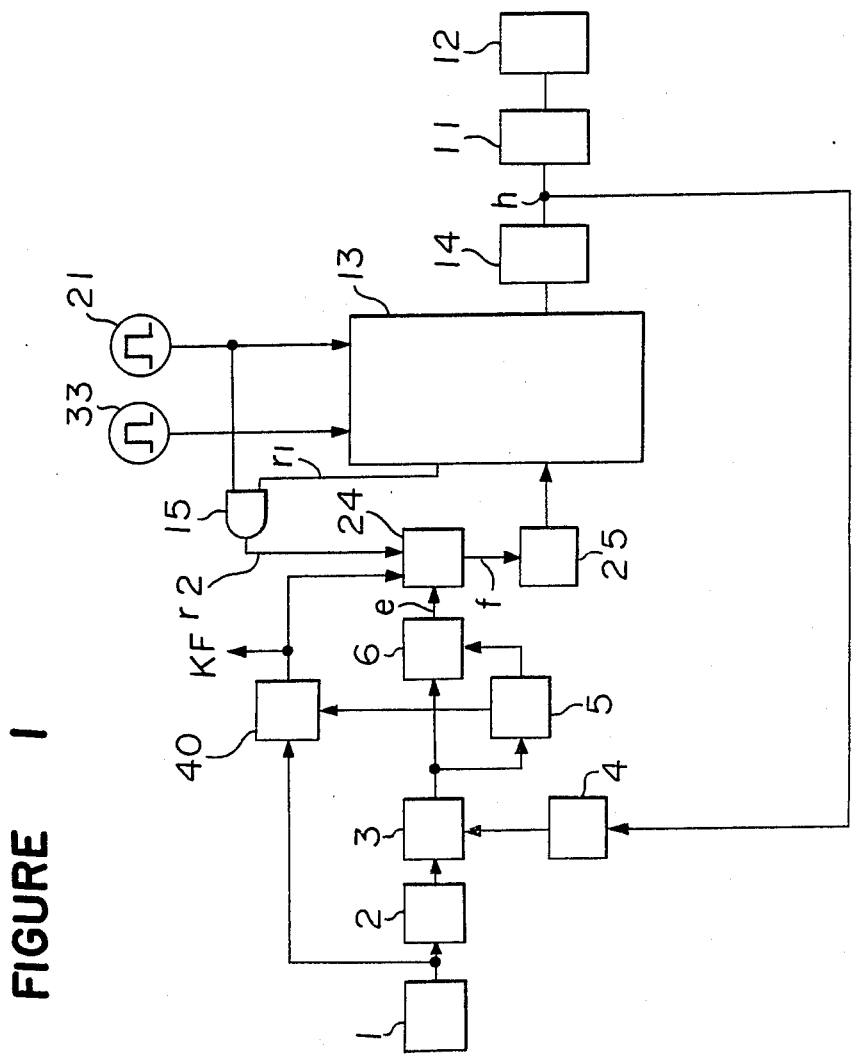
FIG. 1 is a block diagram showing a first embodiment of the ignition timing control apparatus according to the present invention.

Preferred embodiments of the present invention will be described with reference to the drawings. In FIG. 1, reference numerals 1 through 6, 11 and 12 designate the same parts as in FIG. 10 and accordingly, description of these parts is omitted.

Figure 10:
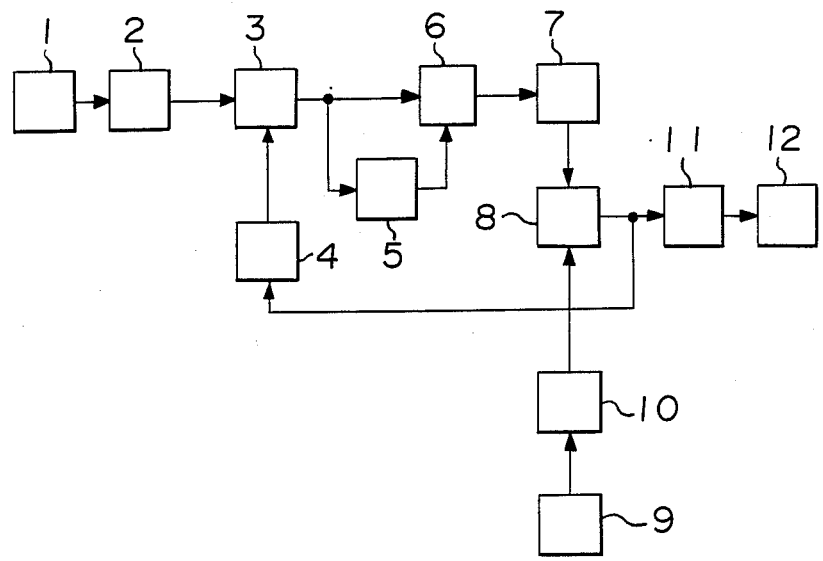
FIG. 10 is a diagram of a conventional ignition timing control apparatus.
Figure 11:
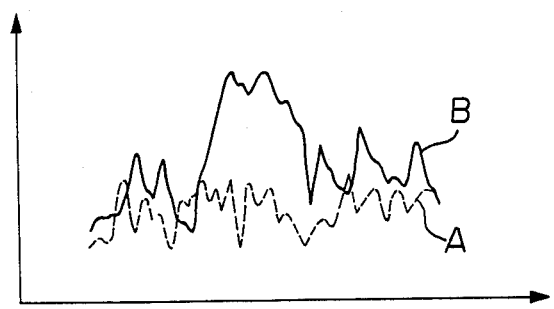
FIG. 11 is a diagram showing the frequency characteristic of an acceleration sensor; and FIGS. (12a-h) and 13(a-h) show the waveforms of signals generated in the conventional apparatus.

A reference numeral 21 designates a cylinder pulse generator for generating a cylinder pulse signal at a predetermined crank angle in response to the ignition timing in each cylinder in the engine; and a numeral 24 designates an integrator which receives a knocking pulse signal from the comparator 6 to output an integrated voltage signal in proportion to the time width of the knocking pulse signal. The integrator is different from the integrator 7 used in the conventional apparatus as shown in FIG. 10 in that it has no function to decrease an integrated voltage with the lapse of time. A numeral 25 designates an A/D transducer to output a signal which is formed by converting the integrated voltage signal from the integrator 24 into a digital signal, a numeral 33 designates a reference pulse generator to generate a reference pulse signal in response to a reference cylinder among the cylinders. (Four cylinders are used in this embodiment). of the engine, and a numeral 13 designates a micro-computer which is adapted to receive the cylinder pulse signal, the reference pulse signal and an output signal from the A/D transducer 25 to operate the ignition timing.

The micro-computer 13 is constituted by an ignition timing controller to obtain an ignition signal on the basis of the cylinder pulse signal, a phase shifter to produce a crank angle for the ignition signal in response to a controlling voltage, a distribution circuit for distributing the output of the A/D transducer 25 in response to the generation of a knocking signal, a memory for memorizing and calculating a signal from the distributing circuit in response to each of the cylinders, a selecting circuit for selecting the output of the memory in response to a fired cylinder, a cylinder selecting pulse generator and a clock generator for generating a pulse singal for subtracting the values in the memory.

A numeral 14 designates a timer to turn-on or off the switching circuit 11 on the basis of an instruction from the micro-computer 13, a numeral 15 designates a resetting means which may be an AND circuit to receive the cylinder pulse signal and the output of the micro-computer 13 to thereby output a resetting singal to the integrator 24, and a numeral 40 designates a fail detecting circuit which detects a failure such as disconnection of a singal line extending between the acceleration sensor 1 and the frequency filter 2, or a short-circuiting to the ground, or an abnormal voltage in the output of the noise level detector 5 whereby a fail signal is forwarded to the integrator 24 and at the same time, a fail signal KF is forwarded to the other devices such as a failure controlling device, an automobile diagnosing device and so on.

Figure 2:
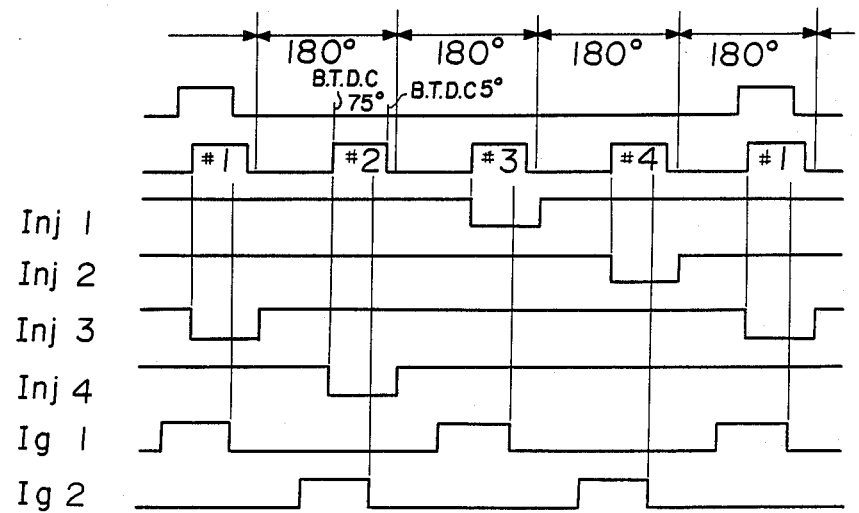
FIG. 2 shows the waveforms of signals obtained in the apparatus showing in FIG. 1.
Figure 3:
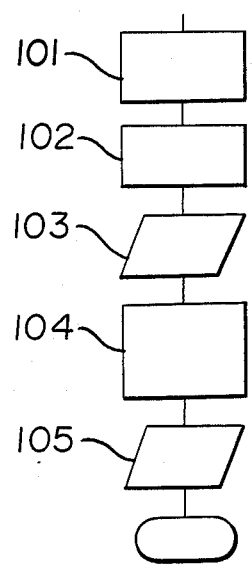
FIGS. 3A, 3B and 3C are flow charts showing the operations of the apparatus shown in FIG. 1.
Figure 3:
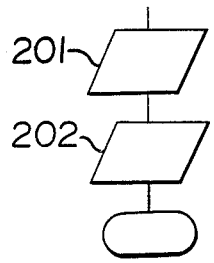
Figure 3:
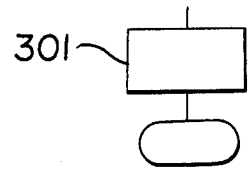

The operation of the ignition timing control apparatus shown in FIG. 1 will be described with reference to a time chart in FIG. 2 and a flow chart in FIG. 3.

The cylinder pulse rises at each angle of BTDC 75° and falls at each angle of BTDC 5°. In the output r1 of the micro-computer 13, there appears a time leg t1 at each rising time and a time lag 42 at each falling time. The time lags are given by means of a software in the micro-computer 13.

The resetting means 15 receives both the cylinder pulse signal and the output r1 of the mciro-computer 13 to thereby produce a resetting signal r2 in accordance with the AND condition. A symbol e represents an output from the comparator, which is the same as the conventional apparatus, a symbol f represents an output from the integrator 24 which is obtained by integrating the output of the comparator, i.e. the knocking pulse signal. The integrater value by the integrator 24 is transformed into a digital signal in the A/D transducer 25. The integrated value is reset by the resetting signal r2. The digital signal is inputted in the micro-computer 13 wherein discrimination of a cylinder or cylinders having the knocking is made, and a signal corresponding to the knocking-generated cylinder obtained as a result of the discrimination is stored in the corresponding memory. The signal stored in the memory is selected at the ignition timing of the corresponding cylinder so that ignition timing is delayed in correspondense to the value stored in the memory, and the voltage given to the ignition coil 12 is controlled to be turned on or off through the timer 14. A symbol h represents an output from the timer 14, a symbol td indicates a time from the falling point of the cylinder pulse signal to the initiation of current conduction in the ignition coil 12, and a symbol ti indicates a time from the rising point of the ignition pulse signal to the time of the ignition to an ignition coil. The value stored in the memory is accumulated in response to the generation of the knocking signals. On the other hand, it is subtracted at each predetermined time when there takes place no knocking, whereby the ignition timing approaches a reference value.

FIG. 3A shows an interruption processing routine at each angle of BTDC 75° of the cylinder pulse signal.

At Step 101, the output of the A/D transducer 25 is read, and at Step 102, the read value is accumulated in the memory. At Step 103, the signal r1 is changed to "H"and at Step 104, the ignition timing is corrected in accordance with the content of the value stored in the memory, namely, a time ti is determined. At Step 105, a signal of time ti is outputted to the timer 14.

FIG. 3B shows an interruption processing routine at each angle of BTDC 5° of the cylinder pulse signal. At Step 201, the signal r1 is changed to "L", and at Step 202, the signal of time td is outputted to the timer 14.

FIG. 3C shows an interruption processing routine at each predetermined time. At Step 301, the content in the memory is subtracted at each predetermined time.

Here, lets consider that there are time lags t1, t2 in the micro-computer 13. If resetting of the integrator 24 is carried out by only the output signal r1 of the micro-computer 13, the resetting and the cancellation of resetting are fairly delayed from the timing of the cylinder pulse signal. Particularly, when the cancellation of the resetting is delayed (in a high revolution speed, e.g. at 6000 rpm, the time lag is about 280 $\mu$sec/10°), the resetting is conducted in a region where a knocking occurs, whereby the correct detection of knocking can not be obtained. Accordingly, in this embodiment, by forming a resetting signal under the AND condition of the signal r1 and the cylinder pulse signal, delay in the cancellation of resetting is prevented.

The fail detecting circuit 40 outputs a fail signal KF when the output of the acceleration sensor 1 is not inputted regularly to the frequency filter 2 by a cause of disconnection in a signal line connecting the acceleration sensor 1 with the frequency filter 2, or the short-circuiting of the line. Generally, there often causes the disconnection of the signal line (for instance, by the fault of the contact at the connecting part). The fail signal KF is also outputted when abnormality is caused in the operation of the noise level detector 5. Even when the signal line between the acceleration sensor 1 and the frequency filter 2 is in a normal state, there may cause an abnormal state such as the level of a signal becoming large so that a reference voltage can not be produced. In this case, the fail detecting circuit 40 detects the fact and produces the fail signal KF. When the integrator 24 receives the fail signal KF, it outputs an integrated voltage as generated in failure regardless of the signal of the comparator 6.

Figure 4:
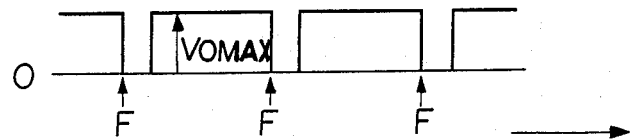
FIGS. 4 and 5 are respectively the waveforms of a signal from an integrator used for the apparatus shown in FIG. 1 when there occurs a failure.
Figure 5:
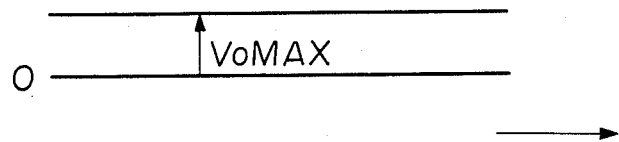

FIGS. 4 and 5 show an example of the integrated voltage when an error takes place. In FIG. 4, the maximum integrated voltage Vo MAX which is the maximum value from the integrator 24 is usually outputted, however, the integrated voltage is reset at each time of ignition (time F) by the ignition output signal of the phase shifter 23, whereby the integrated voltage is made zero at each time of ignition.

In FIG. 5, the resetting of the integrator 24 is not effected by the ignition output signal of the phase shifter 23. The ignition signal may be invalid by the fail signal KF from the fail detection circuit 40. Thus, when the integrated voltage Vo MAX is usually produced, the voltage Vo MAX is stored in the memories 27–30 by which a desired ignition can be determined in a fail time without knocking. In the embodiment shown in FIG. 5, control is carried out with the maximum voltage value Vo MAX of the output of the integrator 24 in a fail time. However, an intermediate value of the output of the integrator 24 may be used. Further, it is possible to incorporate knocking characteristic of an engine or another characteristic. Further, it is possible to carry out a systematic control of engine by inputting the fail signal KF in a fuel control device, or it is possible to realize a systematic control including another control and an alarm by inputting the fail signal in a diagnosing device.

As described above, in accordance with the first embodiment of the present invention, the integrator is reset in response to the operation of the ignition to output a quantity of knocking and the quantity of knocking for each cylinder is obtained by taking only the output of the integrator. Further, the cancellation of resetting in the resetting means is obtained by the cylinder pulse signal when the output of the micro-computer is delayed. Accordingly, the knocking quantity for each cylinder is detected easily in proportion to the knocking quantity. Therefore, there is obtainable an excellent effect such that all of the cylinders of the engine can be operated with efficiency to increase the performance of the engine. Further, the resetting signal is formed by the output signal of the micro-computer and the cylinder pulse signal. Accordingly, the cancellation of resetting is not delayed and the control of the knocking is attained with high accuracy.

Figure 6:
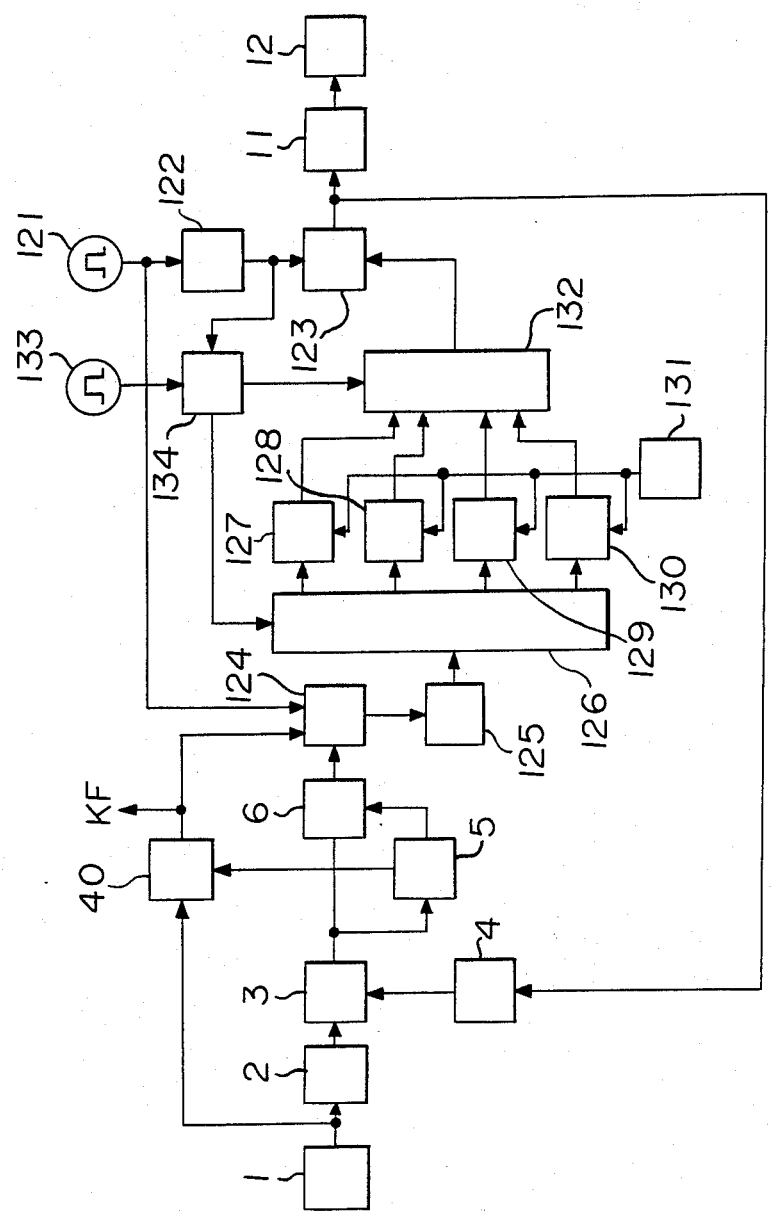
FIG. 6 is a block diagram showing a second embodiment of the ignition timing control apparatus according to the present invention.

The second embodiment of the present invention will be described with reference to the drawings. In FIG. 6, reference numerals 1-6, 11, 12 and 40 designate the same parts as in those of FIG. 1, and therefore, description of these parts is omitted.

A numeral 121 designates a cylinder pulse generator for generating a cylinder pulse signal in response to the operation of ignition timing at each cylinder in the engine and at a crank angle in an area other than the area where a knocking occurs. The cylinder pulse takes place at an angle position between BTDC 75° and BTDC 5°. A numeral 122 designates an ignition timing control circuit which receives the cylinder pulse signal and outputs an igntion pulse signal having a closing rate controlled to assure a current conduction time to the ignition coil 12, a numeral 123 designates a phase shifter for effecting a lag angle control of the ignition pulse signal in response to a control voltage, and a numeral 124 designates an integrator for outputting an integrated voltage in proportion to the time width of the knocking pulse signal from the comparator 6. The integrator is different from the integrator 7 used for the conventional apparatus as shown in FIG. 10 in that it has not function to gradually reducing the integrated voltage value with the lapse of time and is reset on the basis of the cylinder pulse signal as the output of the cylinder pulse generator 121. A numeral 125 designates an A/D transducer for transforming the integrated voltage of the integrator 124 into a digital signal, and a numeral 126 designates a distributing circuit for distributing the digital signal in the cylinder in which the knocking occurs. In this embodiment, the engine with 4 cylinders is used and four outputs are produced from the distributing circuit 126. Numerals 127-130 designate memories (accumulators) for storing digital signals from the distributing circuit 126 in correspondence to each of the cylinders. The memory 127 is, for instance, to store a knocking quantity produced in the first cylinder. A numeral 131 designates a clock generator for inputting a pulse signal to the memories so that the values stored in the memories 127-130 are subtracted, a numeral 132 designates a selecting circuit for selecting and outputting only the data corresponding to the cylinders in response to the outputs of the memories 127-130, a numeral 133 designates a reference pulse generator for generating a reference pulse signal corresponding to the reference cylinder among the four cylinders of the engine, and a numeral 134 designates a cylinder selecting pulse generating circuit which receives the reference pulse signal and the ignition pulse signal of the ignition timing control circuit 122, and produces sucssesively a cylinder selecting pulse signal so that the operational condition of the distributing circuit 126 and the selecting circuit 132 correspond to each of the cylinders.

Figure 7:
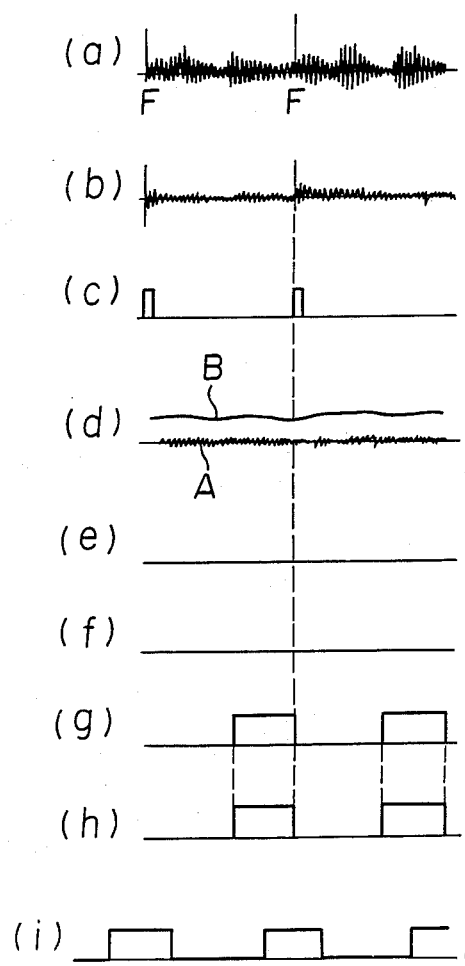
FIGS. 7(a-i) and 8(a-i) show the waveforms of signals obtained in the apparatus shown in FIG. 6.
Figure 8:
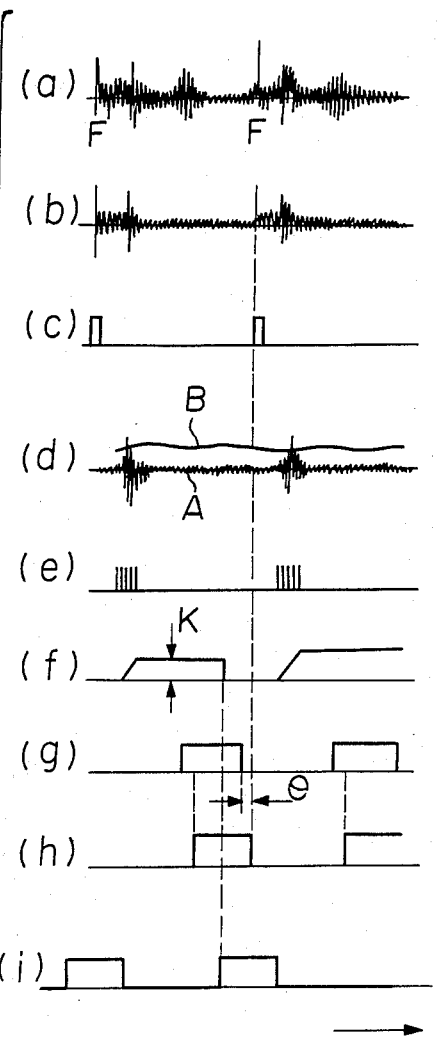
Figure 12:
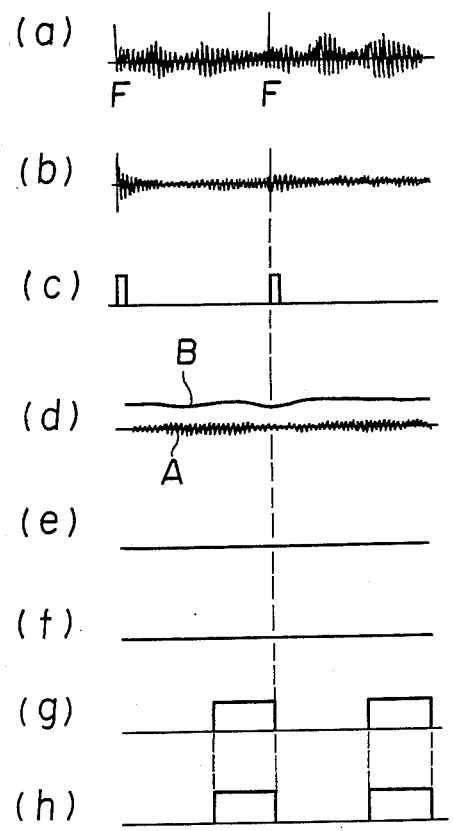
Figure 13:
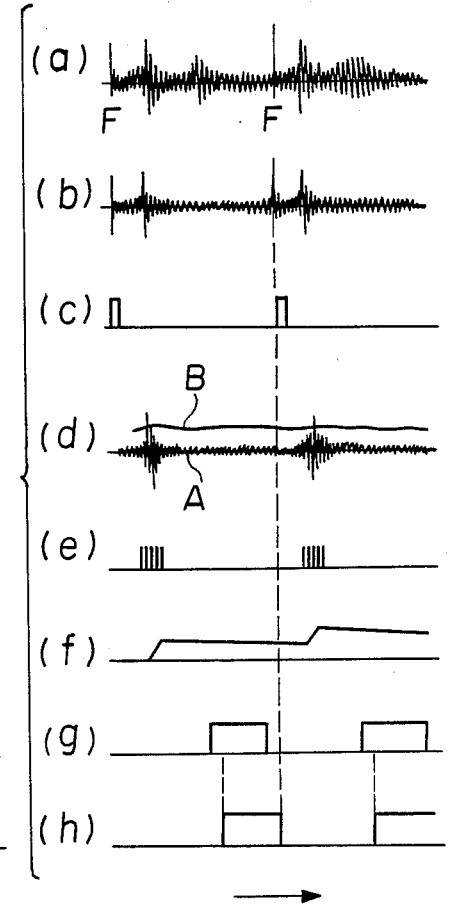

FIGS. 7 and 8 show the waveforms of signals produced in the elements of the apparatus shown in FIG. 6 which generally corresponds to the waveforms as shown in FIGS. 12 and 13.

The basic operation of the second embodiment will be explained with reference to FIGS. 7 and 8.

When there takes place no knocking in the engine, there are two kinds of inputs to the comparator 6 as in FIG. 7d. Since there appears no knocking signal in the signal A in FIG. 7d, any pulse is not outputted from the comparator 6 as shown in FIG. 7e. Accordingly, there appears no output from the integrator 124 (FIG. 7f). Then, there is no value stored in the memories 127–130, and the selecting circuit 132 has no output. Therefore, there is no phase difference between the input of the phase shifter 123 (FIG. 7g) and the output thereof (FIG. 7h), and the ignition timing corresponds to the reference position. A symbol i represents the output of the cylinder pulse generator 121.

FIG. 8 shows a case where a knocking is produced in the engine. Two kinds of inputs to the comparator 6 are as shown in FIG. 8d and there appear knocking signals in the singal A in FIG. 8d. Knocking pulses are outputted from the comparator 6 (FIG. 8e) which are integrated by the integrator 124. The integrator detects the knocking in correspondence to each of the cylinders, and the output of the integrator 124 is reset at the rising part of the output from the cyliner pulse generator 121 at each time of ignition. Accordingly, the magnitude of the output of the integrator 124 is maintained to be a constant value during the time from the detection of the knocking to the time of resetting. The resetting operations are carried out at each time of ignition; the operation constituting a feature in comparison with the operation by the conventional apparatus.

The output (the integrated voltage) of the integrator 124 is transformed into a digital signal in the A/D transducer 125. The distributing circuit 126 discriminates the knocking-generating cylinder on the basis of the cylinder selecting pulse signal from the cylinder selecting pulse generator 134, and inputs the integrated voltage in a digital form from the A/D transducer 125 into the memory 129 which corresponds to, for instance, the third cylinder 2 in which the knocking occurs. The memory 129 stores the integrated voltage value supplied from the distributing circuit 126. The selecting circuit 132 selects the memory 129 corresponding to the third cylinder on the basis of the cylinder selecting pulse from the cylinder selecting pulse generator 134, and outputs the output signal to the phase shifter 123. Since the knocking occurs in the third cylinder in this embodiment, the output of the memory 129 is selected at the ignition timing of the third cylinder so that the output is forwarded to the phase shifter 123. FIG. 8 shows that there also takes place a knocking in the fourth cylinder in the engine having four cylinders. In this case, the output of the integrator 124 is selected by the distributing circuit 126 and stored in the memory 130. The output of the memory 130 is selected by the selecting circuit 132 and is forwarded to the phase shifter 123 at the ignition timing of the fourth cylinder.

In the following, the detailed explanation will be made with reference to FIG. 9 as to control of each cylinder of the engine.

Figure 9:
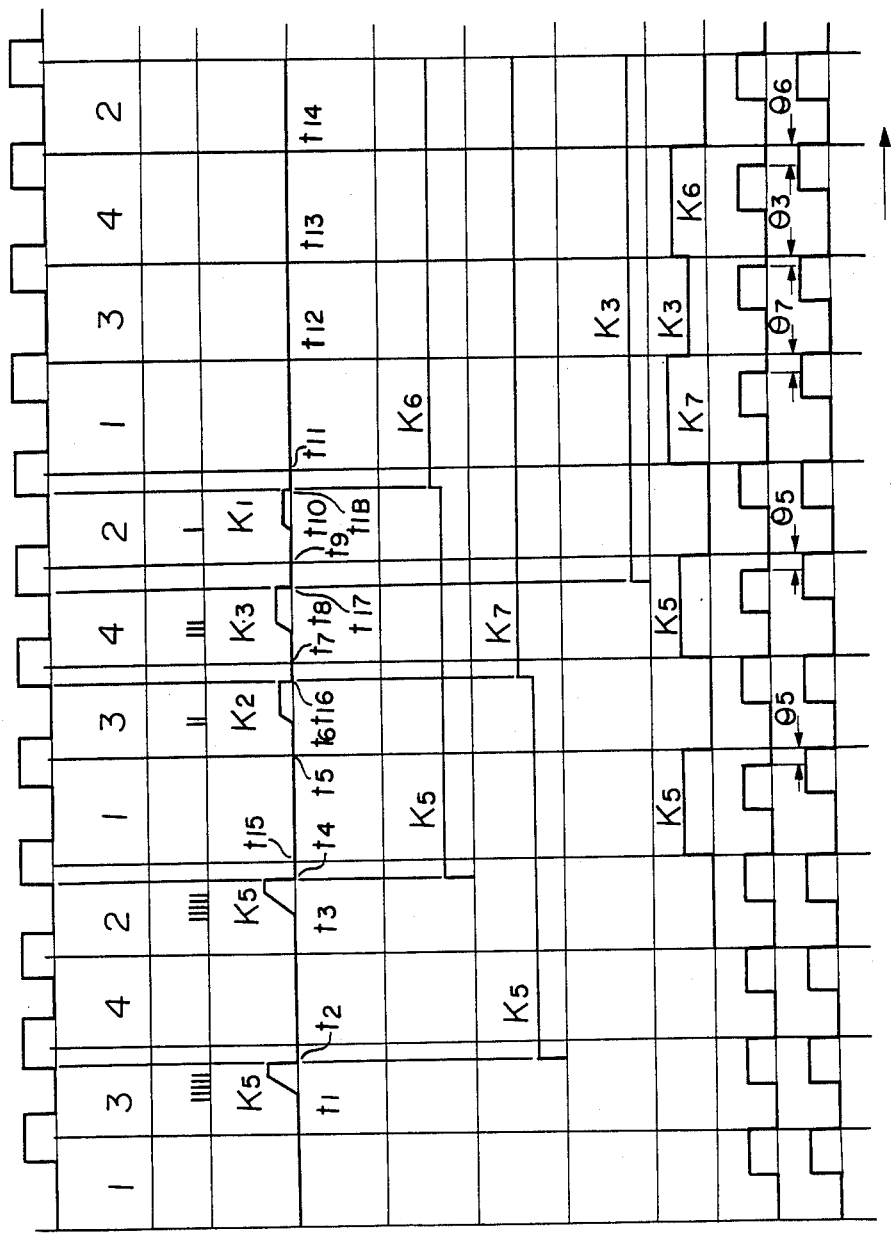
FIG. 9 shows the waveforms of signals in each cylinder of the engine controlled by the ignition timing control apparatus of the present invention.

In FIG. 9, a symbol i represents a cylinder pulse signal, a symbol specifies the cylinder fired, a symbol e represents the output of the comparator 6, a symbol f represents the output of the integrator 124, symbols j, k, l and m respectively represent the values stored in the memories 127–130, a symbol p represents the output of the selecting circuit 132 and symbols g and h represent respectively the input and the output of the phase shifter 123.

As shown in FIG. 9e, the outputofthe comparator 6 includes knocking pulses. The first occurrence of the knocking is in the third cylinder, and the knockings occur the second cylinder, the third cylinder, the fourth cylinder and the second cylinder successively. The pulses are transformed into the integrated voltages in the integrator 124 as shown in FIG. 9 in which the integrated voltages are reset by the cylinder pulse signal. In FIG. 9, K1, K2, K3, and K5 indicate the level of knockings respectively detected. K1 shows the smallest level and K5 shows the greatest level of knocking. FIG. 9 shows that a knocking occurs in the third cylinder at the time point t1 and the output of the integrator 24 is indicated by a voltage K5 which is transformed into a digital signal by the A/D transducer 125 and inputted to the distributing cirucit 126. The distributing circuit 126 selectively outputs the integrated voltage K5 in the digital signal form to the memory 129 at the time of resetting t2 so that the signal is stored in the memory 129. Accordingly, the value stored in the memory 129 is the voltage K5 (FIG. 9l).

A knocking is produced in the second cylinder at the time point t3. The knocking is transformed into an integrated voltage K5 by the integrator 124, and the voltage K5 is transformed into a digital signal by the A/D transducer 125, and then, the digital signal is selectively inputted to the memory 128 by the distributing circuit 126 followed by being stored in the memory 128 at the time point t4 (FIG. 9k).

The time point t15 indicates ignition timing for the first cylinder and then, the operation of ignition for the third cylinder is started. In this case, since the voltage K5 is stored in the memory 129, the voltage K5 is outputted from the selecting circuit 132 (FIG. 9p) to be inputted to the phase shifter 123, whereby the ignition timing is delayed by an angle $\theta 5$ which corresponds to the voltage K5 (delay in phase of the input of the phase shifter 123 (FIG. 9g) to the output of the phase shifter (FIG. 9h)), so that ignition is performed at the time point t5. Although ignition is performed at the time point t5 delayed by the angle $\theta 5$ with respect to the reference ignition time, there produces again a knocking in the third cylinder at the time point t6. The level of the knocking have a value 2 and the integrated voltage K2 corresponding to that level is inputted to the memory 129 at the resetting time point t16. In this case, since the voltage K5 is already stored in the memory 129, the above-mentioned voltage K2 is added thereto, whereby a voltage K7 is stored (FIG. 9l). While ignition is performed at the time point t7 (the reference ignition time), a knocking is produced in the fourth cylinder at the time point t8, whereby an integrated voltage K3 is produced. The voltage K3 is stored in the memory 130 at the time point t17.

On the other hand, the operation of ignition for the second cylinder is started from the time point t7. In this case, since the voltage K5 is stored in the memory 128, the voltage K5 is selectively inputted to the phase shifter 123 from the selecting circuit 132. Then, the next ignition time is t9 which is delayed with respect to the reference by the angle $\theta 5$ corresponding to the voltage K5. While the ignition is effected in the time t9, a knocking occurs in the second cylinder at the time point t10 to thereby produce the integrated voltage K1. The voltage K1 is added to the memory 128 at the resetting time point t18, whereby the value stored in the memory 128 becomes a voltage K6.

The operation of ignition for the third cylinder is started at the time point t11. In this case, since the voltage K7 is stored in the memory 129, the next ignition time t12 is delayed by an angle $\theta 7$ with respect to the reference time.

Thus, control of delaying an angle is repeated in the same manner as above-mentioned. The ignition timing (time t13) for the fourth cylinder is delayed by an angle $\theta 3$ to the reference, and the ignition timing (t14) for the second cylinder is delayed by an angle $\theta 6$ to the reference.

Thus, the ignition timing is delayed in response to the quantity of knocking detected (the integrated voltage), and when the knocking is not produced in the engine, the ignition timing is advanced toward a reference timing at a predetermiend speed to thereby approaching the critical value for producing the knocking. In this embodiment, the values stored in the memories 127–130 are subtracted at a predetermined rate to reduce each value in the memories on the basis of a clock signal from the clock signal generating device 131, whereby the input voltage to the phase shifter 123 is reduced to thereby reducing the value of an angle, approaching the reference value.

In the above-mentioned embodiment, more accurate control of the system including falure controlof the engine can be easily obtained by using computers for the phase shifter 123 and other devices and circuits 124–134.

The ignition timing control apparatus may be constructed in a manner that an lag angle is uniformly applied to all of the cylinders. In this case, the distributing circuit 126 and the selecting circuit 132 which are used for selecting cylinders are fixed and one of the memories 127–130 may be used.

In the second embodiment, the fail detecting circuit 40 is provided in the same manner as the first embodiment. Since the construction and function of the fail detecting circuit is the same as those in the first embodiment, the description is omitted.

In the second embodiment, resetting of the integrated value is carried out in accordance with the cylinder pulse signal. Accordingly, a special treatment of signal is not necessary since the resetting of the integrated value is not produced.

Obviously, numerous modifications and variations of the present invention are possible in light of the above teachings. It is therefore to be understood that within the scope of the appended claims, the invention may be practiced otherwise than as specifically described herein.

What is claimed is:

1. An ignition timing control apparatus for an internal combustion engine comprising a knocking sensor for detecting a knocking produced in said engine, a knocking discriminator for discriminating the knocking produced in each cylinder of said engine on the basis of an output from said knocking sensor, an integrating device for integrating an output from said knocking discriminator, a cylinder pulse generating device for generating a cylinder pulse signal at a predetermined crank angle which corresponds to ignition timing, and a micro-computer for operating ignition timing on the basis of the cylinder pulse signal from said cylinder pulse generating device and the value integrated in said integrating device, said ignition timing control device being characterized by comprising a resetting means to reset said integrated value in response to the operation of ignition timing, wherein the resetting operation by said resetting device is caused when both the cylinder pulse signal and the output signal of said micro-computer are inputted, and the resetting operation is cancelled when at least one of said signals disappears.

2. The ignition timing control apparatus according to claim 1, wherein said resetting means is an AND circuit.

3. The igntition timing control apparatus according to claim 1, wherein the output from said micro-computer is supplied to an ignition coil through a counter.

4. The ignition timing control apparatus according to claim 1, wherein a fail detecting circuit is provided to supply a fail signal to said integrating device.

5. An ignition timing control apparatus for an internal; combustion engine whichcomprises a knocking sensor for detecting a knocking produced in said engine, a knocking discriminator for discriminating the knocking produced in each cylinder of said engine on the basis of an output from said knocking sensor, an integrating device for integrating an output from said knocking discriminator, a cylinder pulse generating device for generating a cylinder pulse signal at a predetermined crank angle in an area other than the area where a knocking occurs and for resetting said integrating device upon receipt of said cylinder pulse signal, an accumulating device for accumulating an output from said integrating device, a phase shifter for controlling, in response to an output from said accumulating device, the phase of an ignition signal corresponding to the cylinder pulse signal, and a switching circuit for feeding and stopping an electric current to an ignition coil in response to an output from said phase shifter.

6. The ignition timing control apparatus according to claim 5, wherein the output of said integrating device is supplied to a distributing circuit which distributes an output to said accumulating device.

7. The ignition timing control apparatus according to claim 6, wherein said accumulating device is provided for each of said cylinder in the engine.

8. The igntion timing control apparatus according to claim 5, wherein a fail detecting circuit is provided to supply a fail signal to said integrating device.

* * * * *